(12) United States Patent
Yu (10) Patent No.: US 10,031,374 B2
(45) Date of Patent: Jul. 24, 2018

(54) VA LIQUID CRYSTAL DISPLAY PANEL BASED ON BM-LESS TECHNOLOGY AND MANUFACTURING METHOD THEREOF

(71) Applicant: Shenzhen China Star Optoelectronics Technology Co., Ltd., Shenzhen (CN)

(72) Inventor: Chengzhong Yu, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 245 days.

(21) Appl. No.: 14/912,609

(22) PCT Filed: Dec. 29, 2015

(86) PCT No.: PCT/CN2015/099623
§ 371 (c)(1),
(2) Date: Feb. 18, 2016

(87) PCT Pub. No.: WO2017/092133
PCT Pub. Date: Jun. 8, 2017

(65) Prior Publication Data
US 2018/0031888 A1    Feb. 1, 2018

(30) Foreign Application Priority Data
Dec. 2, 2015    (CN) .......................... 2015 1 0876145

(51) Int. Cl.
*G02F 1/133*      (2006.01)
*G02F 1/1339*    (2006.01)
(Continued)

(52) U.S. Cl.
CPC ........ *G02F 1/13394* (2013.01); *G02F 1/1339* (2013.01); *G02F 1/1368* (2013.01);
(Continued)

(58) Field of Classification Search
CPC .................................................. G02F 1/13394
See application file for complete search history.

(56) References Cited

U.S. PATENT DOCUMENTS

| 2005/0007525 | A1* | 1/2005 | Jun .................... G02F 1/133512 349/110 |
| 2006/0097414 | A1* | 5/2006 | Chae ......................... G02B 5/22 264/1.27 |
| 2010/0163881 | A1* | 7/2010 | Kang ................. G02F 1/136259 257/59 |

(Continued)

FOREIGN PATENT DOCUMENTS

| CN | 103869548 | * | 6/2014 | .......... G02F 1/1333 |
| CN | 104317111 A | | 1/2015 | |
| CN | 104991371 A | | 10/2015 | |

*Primary Examiner* — Sang V Nguyen
(74) *Attorney, Agent, or Firm* — Leong C. Lei (57) ABSTRACT

The present invention provides a VA liquid crystal display panel based on BM-less technology and a manufacturing method thereof. The VA liquid crystal display panel based on BM-less technology includes a color mixture prevention zone (30) that is formed of a stacked arrangement of red color resist (41) and blue color resist (42) and is used in combination with a main photo spacer and a sub photo spacer that are formed of a black material as a substitute of a black matrix. Further, the color mixture prevention zone has a portion that corresponds to the main photo spacer (71) and the sub photo spacer (72) and includes a recess (31) formed therein. The main photo spacer (71) is in engagement with a bottom of the recess (31) to increase a height difference between the main photo spacer (71) and the sub photo spacer (72) and thus expanding LC margin and ensuring product yield rate.

5 Claims, 5 Drawing Sheets

(51) Int. Cl.
  *G02F 1/1368* (2006.01)
  *G02F 1/1333* (2006.01)
  *G02F 1/1362* (2006.01)

(52) U.S. Cl.
  CPC .. *G02F 1/133345* (2013.01); *G02F 1/136227* (2013.01); *G02F 2001/13396* (2013.01); *G02F 2001/13398* (2013.01); *G02F 2001/136222* (2013.01); *G02F 2201/121* (2013.01); *G02F 2201/123* (2013.01); *G02F 2201/50* (2013.01)

(56) References Cited

U.S. PATENT DOCUMENTS

| | | | |
|---|---|---|---|
| 2010/0315573 A1* | 12/2010 | Hsieh | G02F 1/13394 349/61 |
| 2012/0194933 A1* | 8/2012 | Wu | G02B 5/201 359/891 |
| 2013/0021688 A1* | 1/2013 | Wu | G02B 5/22 359/891 |
| 2015/0034975 A1* | 2/2015 | Rudmann | H01L 27/14625 257/82 |
| 2015/0309377 A1* | 10/2015 | Choi | G02F 1/133514 349/43 |
| 2016/0155908 A1* | 6/2016 | Song | G02F 1/13394 257/59 |
| 2017/0017105 A1* | 1/2017 | Ye | G02F 1/13394 |
| 2017/0038618 A1* | 2/2017 | Wu | G02F 1/136209 |
| 2017/0115517 A1* | 4/2017 | Wu | G02F 1/136227 |
| 2017/0139255 A1* | 5/2017 | Wu | G02F 1/13394 |
| 2017/0153480 A1* | 6/2017 | Lv | G02F 1/13394 |
| 2017/0153519 A1* | 6/2017 | Xu | G02F 1/136227 |

* cited by examiner

VA LIQUID CRYSTAL DISPLAY PANEL BASED ON BM-LESS TECHNOLOGY AND MANUFACTURING METHOD THEREOF

BACKGROUND OF THE INVENTION

1. Field of the Invention

The present invention relates to the field of display technology, and in particular to a VA (Vertical Alignment) liquid crystal display panel based on black matrix (BM) less technology and a manufacturing method thereof.

2. The Related Arts

Liquid crystal displays (LCDs) have a variety of advantages, such as thin device body, low power consumption, and being free of radiation, and are thus of wide applications, such as liquid crystal televisions, mobile phones, personal digital assistants (PDAs), digital cameras, computer monitors, and notebook computer screens, taking a leading position in the field of flat panel displays.

A liquid crystal display panel generally comprises an array substrate, a color filter substrate, and a liquid crystal layer interposed between the array substrate and the color filter substrate. For a convention vertical alignment (VA) liquid crystal display panel, the array substrate comprises thin-film transistors (TFTs) that are arranged in an array, and the color filter substrate is provided with color resist layers for filtering light, a black matrix (BM) for shielding light and preventing mixture of different colors of light, and photo spacers (PSs) supporting a cell gap of the liquid crystal layer between the array substrate and the color filter substrate. The PSs include main PSs and sub PSs. The main PS has a height that is greater than that of the sub PS. When the array substrate and the color filter substrate of the liquid crystal display panel are laminated to each other, the main PSs support and hold the array substrate in position and the sub PSs are spaced from the array substrate. The main PSs are the PSs that persistently provide the effect of supporting under a normal operation condition of the liquid crystal display panel. And, when the liquid crystal display panel receives an excessive external force applied thereto, the sub PSs participate and collaboratively support the array substrate to help enhance the support strength of the PSs.

Figure 1:
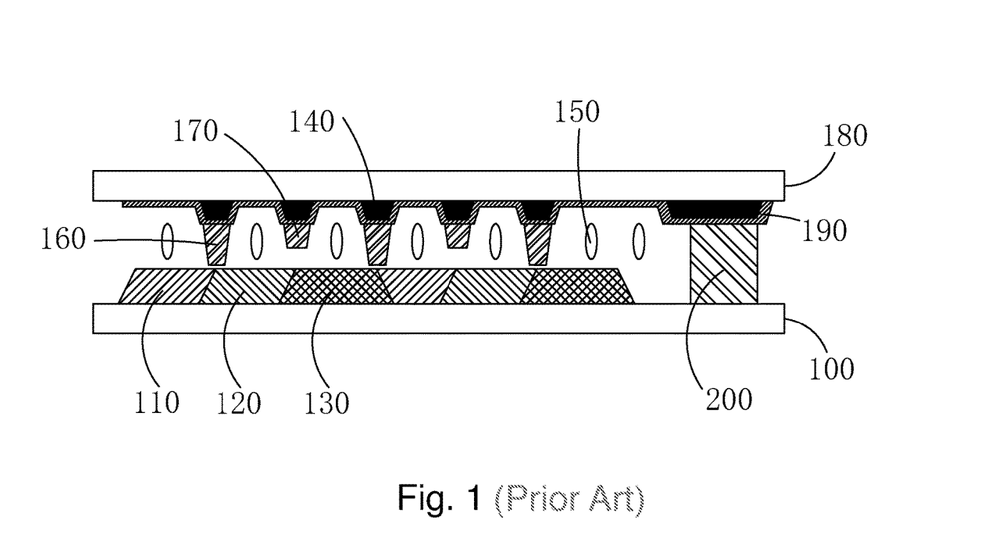
FIG. 1 is a schematic view illustrating the structure of a conventional vertical alignment (VA) liquid crystal display panel based on the color-filter on array (COA) technology.

To reduce the difficulty of manufacturing a liquid crystal display panel, the COA (Color-Filter on Array) technology has been proposed, which involves an integration technique that allows color resists to be directly formed on the TFT array substrate. Referring to FIG. 1, which is a schematic view illustrating the structure of a conventional VA liquid crystal display panel based on the COA technology, the VA liquid crystal display panel comprises: a TFT array substrate 100, red, green, and blue color resists 110, 120, 130 arranged in the form of an array on the TFT array substrate, enclosure sealant 200 arranged along an edge of the TFT array substrate 100, an upper substrate 180 that is opposite to the TFT array substrate 100, and a black matrix 140 arranged on one side of the upper substrate 180 that is adjacent to the TFT array substrate 100, a common electrode 190 arranged on the upper substrate 180 and the black matrix 140, main photo spacers 160 and sub photo spacers 170 that are arranged on the common electrode 190 and located exactly under the back matrix 140, and a liquid crystal layer 150 arranged between the TFT array substrate 100 and the upper substrate 180. Since the VA liquid crystal display panel applies a vertical electric field to drive the arrangement of the liquid crystal, for the purpose of reducing the manufacturing cost, there is no need to provide a planarization layer between the electric field and the color resists as an IPS (In-Plane Switching) liquid crystal display panel does.

Figure 2:
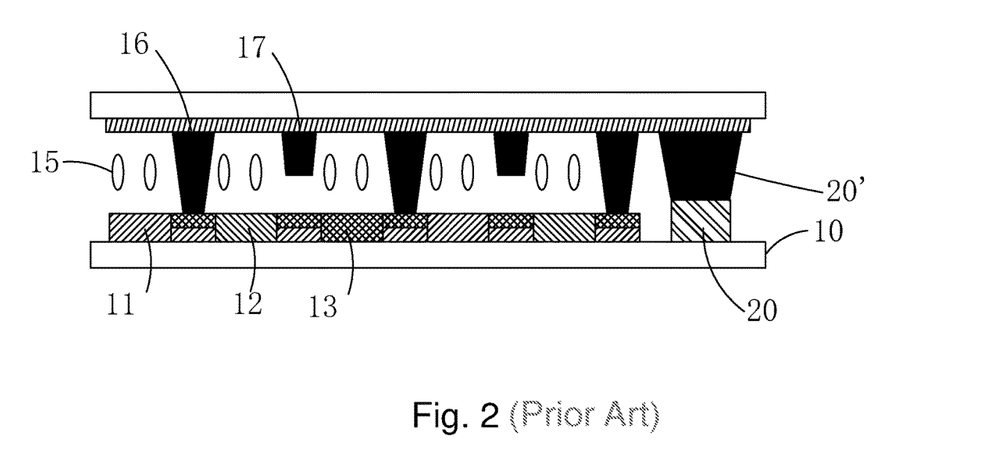
FIG. 2 is a schematic view illustrating the structure of a conventional VA liquid crystal display panel based on the black matrix (BM) less technology.

To further reduce the manufacturing cost of a liquid crystal display panel, the BM-less technology that eliminates the material and process of black matrix involved has been proposed. FIG. 2 is a schematic view illustrating the structure of a VA liquid crystal display panel based on the BM-less technology, wherein two color resists are selected among red, green, and blue color resists 11, 12, 13, where in FIG. 1, red and blue color resists 11, 13 are used as an example, and are stacked at locations where gate lines (not shown) and data lines (not shown) are formed on the TFT array substrate 10 to prevent color mixture of red, green, and blue colors; main photo spacers 16 and sub photo spacers 17 that are made of a black material are provided on an upper substrate 19 to support a cell gap of a liquid crystal layer 15 and to provide an effect of light shielding; and an edge frame 20' that is formed on the upper substrate 19 and similarly made of the black material and enclosure sealant 20 that is provided on a TFT array substrate 10 in a corresponding manner are arranged to achieve bonding and sealing between the TFT array substrate 10 and the upper substrate 19, whereby the material and process involving the black matrix can be eliminated to reduce, to quite an extent, the manufacturing cost of the liquid crystal display panel.

With the increase or decrease of the environmental temperature, materials, such as a glass substrate and liquid crystal, may undergo expansion or contraction. Since the thermal expansion coefficient of the liquid crystal is greater than the thermal expansion coefficients of other components, such as glass substrates and photo spacers, under a high temperature condition, the thermal expansion of the liquid crystal is generally greater than that of the other component, leading to an increase of the cell gap of the liquid crystal layer and the photo spacers not undergoing a corresponding amount of thermal expansion, so that the liquid crystal of a vertically positioned liquid crystal display panel would be caused to flow downward, in the entirety thereof, under gravity, leading to defect of gravity based inhomogeneity of displaying, namely gravity mura; and under a low temperature condition, the contraction of the liquid crystal is greater than those of other components, so that if the cell gap of the liquid crystal layer maintains unchanged, the liquid crystal cannot completely fill up the liquid crystal cell, leading to the emergence of air bubbles, namely low temperature bubble defects.

Under the assumption that the liquid crystal cell gap is d, the variation of the liquid crystal cell gap is $\Delta d$, the height of the main photo spacers is $H_M$, and the height of the sub photo spacers is $H_S$, when temperature drops and liquid crystal contracts, the bubble defect occurs under the condition $|\Delta d|>|H_M-H_S|$; and when temperature rises and liquid crystal expands, gravity mura occurs under the condition $d+|\Delta d|>H_M$. Skilled persons of this field refer an allowable liquid crystal control range that does not cause gravity mura in high temperature and bubble defect in low temperature as liquid crystal (LC) margin.

Figure 3:
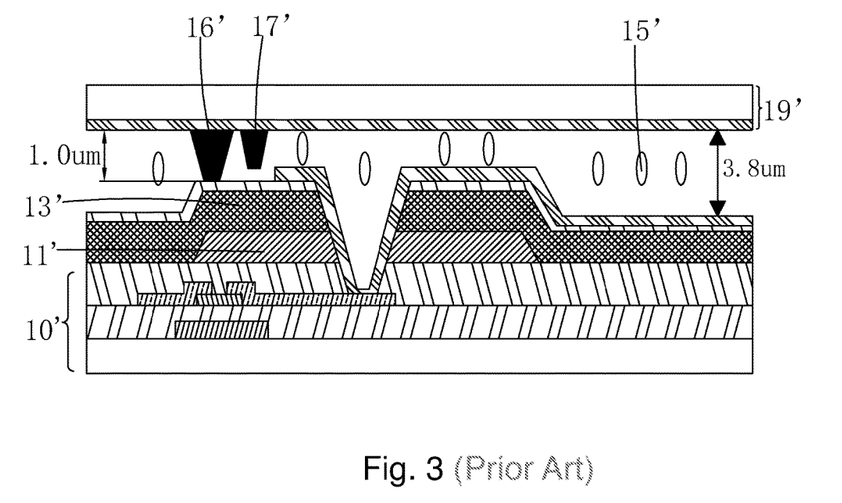
FIG. 3 is a schematic view illustrating an actual structure of a conventional VA liquid crystal display panel based on the BM-less technology.

Referring to FIG. 3, in an actual VA liquid crystal display panel based on the BM-less technology, red and blue color resists 11', 13' are stacked through direct deposition at locations corresponding to gate lines (not shown) and data lines (not shown) formed on a TFT array substrate 10' in order to prevent color mixture among red, green, and blue colors. For the 3.8 um cell gap that is currently commonly adopted for the liquid crystal layer 15', the height difference between the main photo spacers 16' and the sub photo spacers 17' may need to be as high as 0.4 um to provide a sufficient LC margin and this needs to make the height of the main photo spacers 16' greater than 2.5 um. If the film thicknesses of the red, green, and blue color resists are respectively set as 3.0 um, 3.0 um, and 3.2 um, then without the arrangement of a planarization layer, considering the leveling characteristics of the color resists, the color mixture prevention zone at the stacking site of two color resists must be of a height exceeding other pixel zones by approximately 2.8 um. Under this condition, the height of the main photo spacer 16' at the stacking site of the two color resists would be only 1.0 um, while the height of the sub photo spacer 17' is around 0.85-0.90 um. In other words, the height difference between the main photo spacer 16' and the sub photo spacer 17' is only 0.1-0.15 um and the insufficient height difference between the two would lead to an insufficient LC margin of the liquid crystal display panel, thereby affecting yield rate of products.

SUMMARY OF THE INVENTION

An object of the present invention is to provide a vertical alignment (VA) liquid crystal display panel based on black matrix (BM)-less technology, which helps increase a height difference between a main photo spacer and a sub photo spacer, expands the LC margin, and ensure product yield rate.

Another object of the present invention is to provide a manufacturing method of a VA liquid crystal display panel based on BM-less technology, which helps increase a height difference between a main photo spacer and a sub photo spacer, expands the LC margin, and ensure product yield rate.

To achieve the above objects, the present invention provides a VA liquid crystal display panel based on BM-less technology, which comprises: a lower substrate, a TFT layer formed on the lower substrate, a protective layer formed on the TFT layer, a color resist layer formed on the protective layer, a passivation layer formed on the color resist layer, a pixel electrode layer formed on the passivation layer, an upper substrate arranged opposite to the lower substrate, a common electrode layer formed on one side of the upper substrate that is adjacent to the lower substrate, a main photo spacer and a sub photo spacer formed on the common electrode layer, an enclosure sealant formed on an edge portion of the lower substrate, an edge frame formed on an edge portion of the common electrode layer and corresponding to the enclosure sealant, and a liquid crystal layer arranged between the lower substrate and the upper substrate;

the color resist layer comprising red color resist, green color resist, and blue color resist that are arranged in the form of an array, a color mixture prevention zone being arranged between every two adjacent ones of the color resists and formed of a stacked arrangement of red color resist and blue color resist;

the main photo spacer and the sub photo spacer being arranged to correspond to the color mixture prevention zone, the color mixture prevention zone having a portion that is opposite to the main photo spacer and the sub photo spacer and is provided with a recess formed therein in such a way that the main photo spacer is in engagement with a bottom of the recess;

the main photo spacer, the sub photo spacer, and the edge frame each formed of a material that comprises a black material.

Optionally, in the color mixture prevention zone, the blue color resist is stacked on the red color resist and the recess is formed in the blue color resist, the red color resist having a flat upper surface.

Optionally, in the color mixture prevention zone, the blue color resist is stacked on the red color resist, the recess is formed in the blue color resist, and the red color resist has a portion that corresponds to and is located under the recess and is provided with a second recess.

The TFT layer comprises: a gate electrode formed on the lower substrate, a gate insulation layer formed on the lower substrate and the gate electrode, a semiconductor layer formed on the gate insulation layer, and a source electrode and a drain electrode formed on the gate insulation layer and respectively connected to two opposite ends of the semiconductor layer;

the pixel electrode layer being connected through a via extending through the passivation layer, the color mixture prevention zone, and the protective layer to connect to the drain electrode.

The color resist layer further comprises at least one of white color resist and yellow color resist.

The present invention also provides a manufacturing method of a VA liquid crystal display panel based on BM-less technology, which comprises the following steps:

(1) providing a lower substrate and forming a TFT layer on the lower substrate;

(2) depositing a protective layer on the TFT layer and the lower substrate;

(3) forming a color resist layer on the protective layer, wherein the color resist layer comprises red color resist, green color resist, and blue color resist that are arranged in the form of an array and a color mixture prevention zone is arranged between every two adjacent ones of the color resists and is formed of a stacked arrangement of red color resist and blue color resist; the color mixture prevention zone comprises a recess formed therein;

(4) depositing and patterning a passivation layer on the color resist layer, forming a pixel electrode layer on the passivation layer, coating enclosure sealant on an edge portion of the lower substrate;

(5) providing an upper substrate and forming a common electrode layer on one side of the upper substrate that is adjacent to the lower substrate;

(6) using a black material to form a main photo spacer, a sub photo spacer, and an edge frame on the common electrode layer; and (7) laminating the lower substrate and the upper substrate to each other and filling a liquid crystal layer such that the main photo spacer and the sub photo spacer correspond to the recess with the main photo spacer in engagement with a bottom of the recess and the edge frame and the enclosure sealant engage each other.

Optionally, step (3) comprises:

(31) using a regular mask to sequentially form red color resist and green color resist on the protective layer; and (32) coating a blue color resist film, patterning the blue color resist film by using a half-tone mask to form blue color resist and a color mixture prevention zone that is located between two adjacent ones of the color resists and comprises red color resist and blue color resist stacked on the red color resist, and using the half-tone mask to conduct etching on the blue color resist to form a recess in the color mixture prevention zone.

Optionally, step (3) comprises:

(31) coating a red color resist film on the protective layer, patterning the red color resist film by using a half-tone mask to form red color resist and a second recess located in the red color resist;

(32) using a regular mask to form green color resist; and (33) coating and patterning blue color resist film with a regular mask to form blue color resist and a color mixture prevention zone that is located between two adjacent ones of the color resists and comprises red color resist and blue color resist stacked on the red color resist, wherein in the color mixture prevention zone, the blue color resist shows inclination of flowing on the second recess incorporated in the red color resist so as to naturally form a recess.

The TFT layer comprises: a gate electrode formed on the lower substrate, a gate insulation layer formed on the lower substrate and the gate electrode, a semiconductor layer formed on the gate insulation layer, and a source electrode and a drain electrode formed on the gate insulation layer and respectively connected to two opposite ends of the semiconductor layer;

the pixel electrode layer being connected through a via extending through the passivation layer, the color mixture prevention zone, and the protective layer to connect to the drain electrode The present invention further provides a VA liquid crystal display panel based on BM-less technology, which comprises: a lower substrate, a TFT layer formed on the lower substrate, a protective layer formed on the TFT layer, a color resist layer formed on the protective layer, a passivation layer formed on the color resist layer, a pixel electrode layer formed on the passivation layer, an upper substrate arranged opposite to the lower substrate, a common electrode layer formed on one side of the upper substrate that is adjacent to the lower substrate, a main photo spacer and a sub photo spacer formed on the common electrode layer, an enclosure sealant formed on an edge portion of the lower substrate, an edge frame formed on an edge portion of the common electrode layer and corresponding to the enclosure sealant, and a liquid crystal layer arranged between the lower substrate and the upper substrate;

the color resist layer comprising red color resist, green color resist, and blue color resist that are arranged in the form of an array, a color mixture prevention zone being arranged between every two adjacent ones of the color resists and formed of a stacked arrangement of red color resist and blue color resist;

the main photo spacer and the sub photo spacer being arranged to correspond to the color mixture prevention zone, the color mixture prevention zone having a portion that is opposite to the main photo spacer and the sub photo spacer and is provided with a recess formed therein in such a way that the main photo spacer is in engagement with a bottom of the recess;

the main photo spacer, the sub photo spacer, and the edge frame each formed of a material that comprises a black material;

wherein in the color mixture prevention zone, the blue color resist is stacked on the red color resist and the recess is formed in the blue color resist, the red color resist having a flat upper surface;

wherein the TFT layer comprises: a gate electrode formed on the lower substrate, a gate insulation layer formed on the lower substrate and the gate electrode, a semiconductor layer formed on the gate insulation layer, and a source electrode and a drain electrode formed on the gate insulation layer and respectively connected to two opposite ends of the semiconductor layer;

the pixel electrode layer being connected through a via extending through the passivation layer, the color mixture prevention zone, and the protective layer to connect to the drain electrode;

wherein the color resist layer further comprises at least one of white color resist and yellow color resist.

The efficacy of the present invention is that the present invention provides a VA liquid crystal display panel based on BM-less technology, which comprises a color mixture prevention zone formed of a stacked arrangement of red color resist and blue color resist, which can be used, in combination with a main photo spacer and a sub photo spacer that is formed of a black material as a substitute of a black matrix. Further, the color mixture prevention zone has a portion that corresponds to the main photo spacer and the sub photo spacer and comprises a recess formed therein in such a way that the main photo spacer is in engagement with a bottom of the recess to thereby increase a height difference between the main photo spacer and the sub photo spacer, expanding LC margin, and ensuring product yield rate. The present invention provides a manufacturing method of a VA liquid crystal display panel based on BM-less technology, which, through forming a color mixture prevention zone formed of a stacked arrangement of red color resist and blue color resist for use in combination with a main photo spacer and a sub photo spacer that is formed of a black material as a substitute of a black matrix, and subjecting the blue color resist or the red color resist to patterning treatment by using a the half-tone mask to form a recess in the color mixture prevention zone to increase a height difference between the main photo spacer and the sub photo spacer, helps expand LC margin and ensure product yield rate.

BRIEF DESCRIPTION OF THE DRAWINGS

The technical solution, as well as other beneficial advantages, of the present invention will be apparent from the following detailed description of embodiments of the present invention, with reference to the attached drawing. In the drawing.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 4:
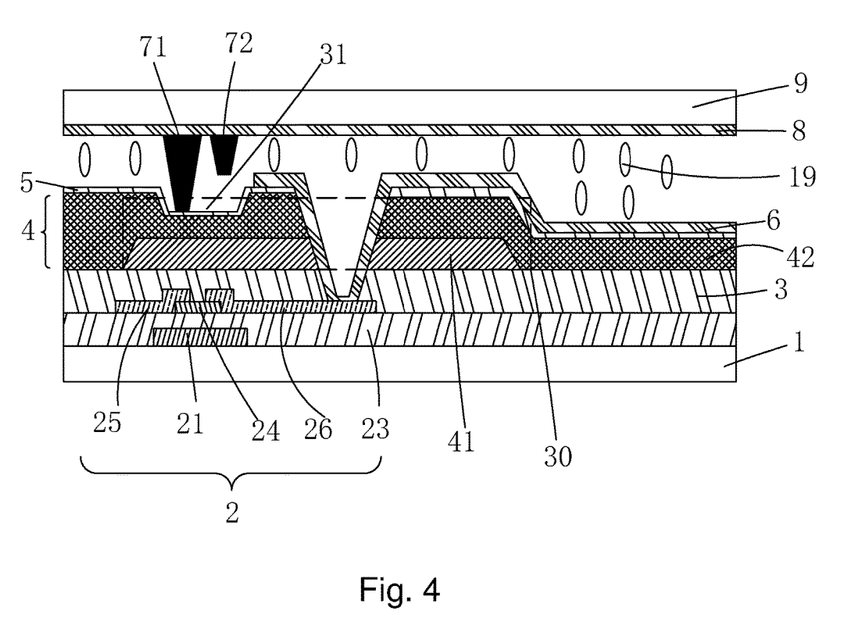
FIG. 4 is a schematic view illustrating the structure of a conventional VA liquid crystal display panel based on the BM-less technology according to a first embodiment of the present invention.

Firstly, the present invention provides a vertical alignment (VA) liquid crystal display panel based on black matrix (BM)-less technology. FIG. 4 shows a first embodiment of the VA liquid crystal display panel based on BM-less technology according to the present invention, which comprises: a lower substrate 1, a thin-film transistor (TFT) layer 2 formed on the lower substrate 1, a protective layer 3 formed on the TFT layer 2, a color resist layer 4 formed on the protective layer 3, a passivation layer 5 formed on the color resist layer 4, a pixel electrode layer 6 formed on the passivation layer 5, an upper substrate 9 arranged opposite to the lower substrate 1, a common electrode layer 8 formed on one side of the upper substrate 9 that is adjacent to the lower substrate 1, a main photo spacer 71 and a sub photo spacer 72 formed on the common electrode layer 8, an enclosure sealant (not shown) formed on an edge portion of the lower substrate 1, an edge frame (not shown) formed on an edge portion of the common electrode layer 8 and corresponding to the enclosure sealant, and a liquid crystal layer 19 arranged between the lower substrate 1 and the upper substrate 9.

The color resist layer 4 comprises red color resist 41, green color resist (not shown), and blue color resist 42 that are arranged in the form of an array and arranged between every two adjacent ones of the color resists is a color mixture prevention zone 30 that is formed of a stacked arrangement red color resist 41 and blue color resist 42.

The main photo spacer 71 and the sub photo spacer 72 are arranged to correspond to the color mixture prevention zone 30. The color mixture prevention zone 30 has a portion that is opposite to the main photo spacer 71 and the sub photo spacer 72 and is provided with a recess 31 formed therein in such a way that the main photo spacer 71 is in engagement with a bottom of the recess 31.

The main photo spacer 71, the sub photo spacer 72, and the edge frame are each formed of a material that comprises a black material.

For the first embodiment illustrated in FIG. 1, in the color mixture prevention zone 30, the blue color resist 42 is stacked on the red color resist 41; the recess 31 is formed in the blue color resist 42; the red color resist 41 has an upper surface that is flat; and the recess 31 is formed in the blue color resist 42 by directly etching the blue color resist 42. The formation of the recess 31 expands the space for accommodating the main photo spacer 71 and the sub photo spacer 72 thereby increasing the available height of the main photo spacer 71 so as to increase the height difference between the main photo spacer 71 and the sub photo spacer 72 and increase the LC margin thereby overcoming the issue of insufficient LC margin resulting from the adoption of the BM-less technology and ensuring product yield rate. Further, the height difference between the main photo spacer 71 and the sub photo spacer 72 can be changed by varying the depth of the recess 31. The maximum available depth of the recess 31 is the film thickness of the blue color resist 42. In this way, under the condition of the commonly used 3.8 um cell gap of the liquid crystal layer 19, with the film thicknesses of the red, green, and blue color resists being respectively set to be 3.0 um, 3.0 um, and 3.2 um, due to the arrangement of the recess 31, the height difference between the main photo spacer 71 and the sub photo spacer 72 can be increased to at least 0.4 um thereby ensuring a desired LC margin and preventing gravity mura. In addition, the sub photo spacer 72 is also located in the recess 31 and displacement caused by a sliding movement of a distal end of the sub photo spacer 72, which is a free end, can be prevented thereby lowering down the potential risk of generating bubble occurring at a temperature.

Specifically, the TFT layer 2 comprises: a gate electrode 21 formed on the lower substrate 1, a gate insulation layer 23 formed on the lower substrate 1 and the gate electrode 21, a semiconductor layer 24 formed on the gate insulation layer 23, and a source electrode 25 and a drain electrode 26 formed on the gate insulation layer 23 and respectively connected to two opposite ends of the semiconductor layer 24. The pixel electrode layer 6 is connected through a via extending through the passivation layer 5, the color mixture prevention zone 30, and the protective layer 3 to connect to the drain electrode 26.

The pixel electrode layer 6 and the common electrode layer 8 are each formed of a material comprising indium tin oxide (ITO).

Particularly, the color resist layer 4 may further comprise at least one of white color resist and yellow color resist.

Figure 5:
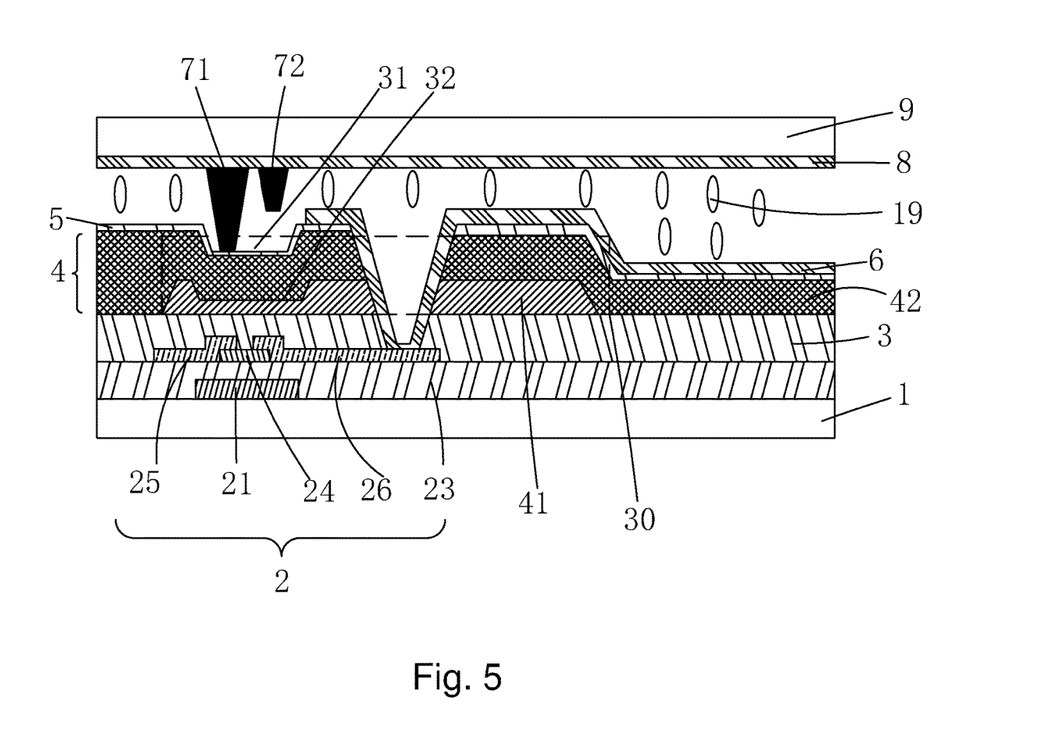
FIG. 5 is a schematic view illustrating the structure of a conventional VA liquid crystal display panel based on the BM-less technology according to a second embodiment of the present invention.

FIG. 5 shows a second embodiment of the VA liquid crystal display panel based on BM-less technology according to the present invention, and the second embodiment is different from the first embodiment in that in the color mixture prevention zone 30, the blue color resist 42 is stacked on the red color resist 41; the recess 31 is formed in the blue color resist 42; the red color resist 41 has a portion that corresponds to and is located under the recess 31 and is provided with a second recess 32 formed therein; and the second recess 32 is formed in the red color resist 41 by directly etching the red color resist 41. The maximum available depth of the second recess 32 is the film thickness of the red color resist 41. The recess 31 may be naturally formed due to the inclination of blue color resist 42 to flow on the second recess 32 incorporated in the red color resist 41 so that there is no need to apply etching to the blue color resist 42. The remaining structure and the functionality of the recess 31 are identical to those of the first embodiment and no repeated description will be given herein.

Figure 6:
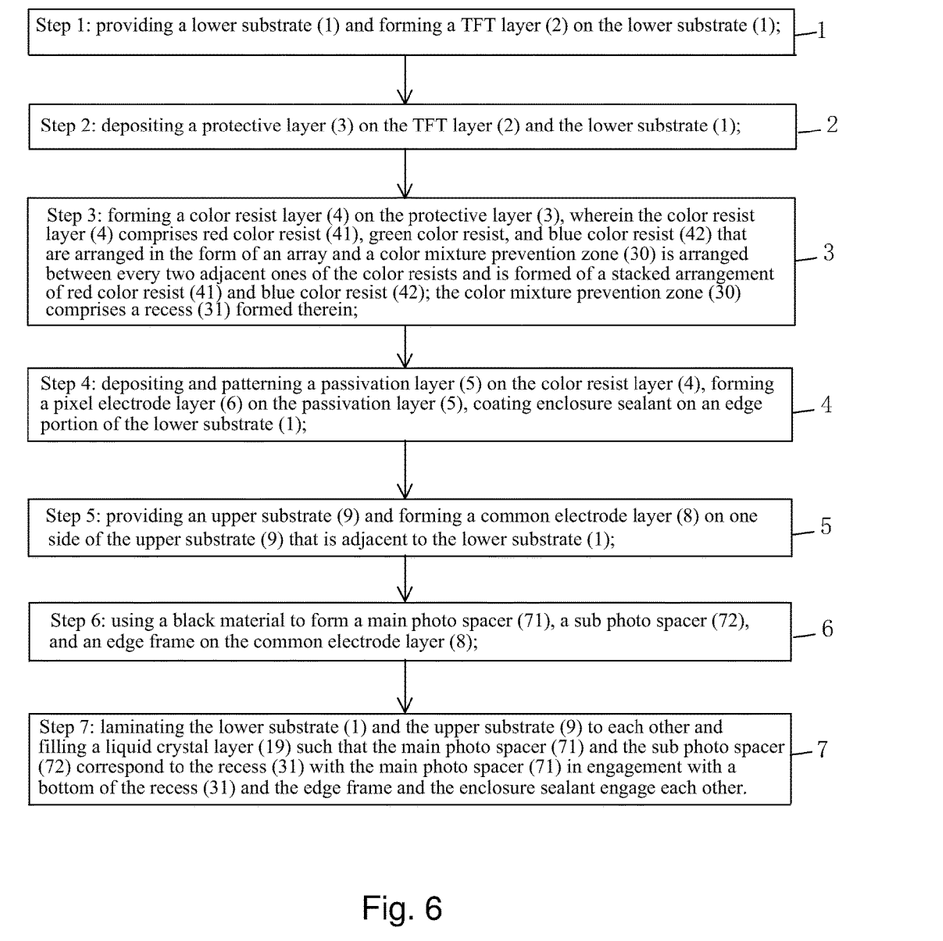
FIG. 6 is a flow chart illustrating a manufacturing method of a VA liquid crystal display panel based on the BM-less technology according to the present invention.

Referring to FIG. 6, in combination with FIG. 4 or 5, the present invention also provides a manufacturing method of the VA liquid crystal display panel based on BM-less technology, which comprises the following steps:

Step 1: providing a lower substrate 1 and forming a TFT layer 2 on the lower substrate 1.

Specifically, the lower substrate 1 is preferably a glass substrate. The TFT layer 2 comprises: a gate electrode 21 formed on the lower substrate 1, a gate insulation layer 23 formed on the lower substrate 1 and the gate electrode 21, a semiconductor layer 24 formed on the gate insulation layer 23, and a source electrode 25 and a drain electrode 26 formed on the gate insulation layer 23 and respectively connected to two opposite ends of the semiconductor layer 24.

Step 2: depositing a protective layer 3 on the TFT layer 2 and the lower substrate 1.

Specifically, the protective layer 3 is formed of an insulation material, such as silicon nitride (SiNx) and silicon oxide (SiOx).

Step 3: forming a color resist layer 4 on the protective layer 3.

The color resist layer 4 comprises red color resist 41, green color resist, and blue color resist 42 that are arranged in the form of an array and arranged between every two adjacent ones of the color resists is a color mixture prevention zone 30 that is formed of a stacked arrangement of red color resist 41 and blue color resist 42. The color mixture prevention zone 30 comprises a recess 31 formed therein.

Optionally, to make a liquid crystal display panel as that illustrated in FIG. 4, Step 3 may comprises the following steps:

Step 31: using a regular mask to sequentially form red color resist 41 and green color resist on the protective layer 3; and Step 32: coating a blue color resist film, patterning the blue color resist film by using a half-tone mask to form blue color resist 42 and a color mixture prevention zone 30 that is located between two adjacent ones of the color resists and comprises red color resist 41 and blue color resist 42 stacked on the red color resist 41, and using the half-tone mask to conduct etching on the blue color resist 42 to form a recess 31 in the color mixture prevention zone 30.

Specifically, Step 32 may control an etched depth of the recess 31 by controlling light transmission rate of the half-tone mask. The maximum available depth of the recess 31 is the film thickness of the blue color resist 42.

Optionally, to make a liquid crystal display panel as that illustrated in FIG. 5, Step 3 may comprises the following steps:

Step 31: coating a red color resist film on the protective layer 3, patterning the red color resist film by using a half-tone mask to form red color resist 41 and a second recess 32 located in the red color resist 41.

Specifically, Step 31 may control an etched depth of the second recess 32 by controlling light transmission rate of the half-tone mask. The maximum available depth of the second recess 32 is the film thickness of the red color resist 41.

Step 32: using a regular mask to form green color resist.

Step 33: coating and patterning blue color resist film with a regular mask to form blue color resist 42 and a color mixture prevention zone 30 that is located between two adjacent ones of the color resists and comprises red color resist 41 and blue color resist 42 stacked on the red color resist 41, wherein in the color mixture prevention zone 30, the blue color resist 42 shows the inclination of flowing on the second recess 32 incorporated in the red color resist 41 so as to naturally form a recess 31.

Step 4: depositing and patterning a passivation layer 5 on the color resist layer 4, forming a pixel electrode layer 6 on the passivation layer 5, coating enclosure sealant on an edge portion of the lower substrate 1.

Specifically, the pixel electrode layer 6 is connected through a via extending through the passivation layer 5, the color mixture prevention zone 30, and the protective layer 3 to connect to the drain electrode 26. The passivation layer 5 is formed of an insulation material, such as SiNx and SiOx. The pixel electrode layer 6 is formed of a material comprising ITO.

Step 5: providing an upper substrate 9 and forming a common electrode layer 8 on one side of the upper substrate 9 that is adjacent to the lower substrate 1.

Specifically, the upper substrate 9 is preferably a glass substrate; and the common electrode layer 8 is formed of a material comprising ITO.

Step 6: using a black material to form a main photo spacer 71, a sub photo spacer 72, and an edge frame on the common electrode layer 8.

Specifically, the main photo spacer 71 formed in Step 6 is higher than the sub photo spacer 72. A height difference between the two can be controlled by controlling the light transmission rate of a half-tone mask or a gray-scale mask.

Step 7: laminating the lower substrate 1 and the upper substrate 9 to each other and filling a liquid crystal layer 19 such that the main photo spacer 71 and the sub photo spacer 72 correspond to the recess 31 with the main photo spacer 71 in engagement with a bottom of the recess 31 and the edge frame and the enclosure sealant engage each other.

In the above-described method, due to the formation of the recess 31, the space for accommodating the main photo spacer 71 and the sub photo spacer 72 is expanded, thereby increasing the available height of the main photo spacer 71 so as to increase the height difference between the main photo spacer 71 and the sub photo spacer 72 and increase the LC margin thereby overcoming the issue of insufficient LC margin resulting from the adoption of the BM-less technology and ensuring product yield rate. For example, under the condition of the commonly used 3.8 um cell gap of the liquid crystal layer 19, with the film thicknesses of the red, green, and blue color resists being respectively set to be 3.0 um, 3.0 um, and 3.2 um, due to the arrangement of the recess 31, the height difference between the main photo spacer 71 and the sub photo spacer 72 can be increased to at least 0.4 um thereby ensuring a desired LC margin and preventing gravity mura. In addition, the sub photo spacer 72 is also located in the recess 31 and displacement caused by a sliding movement of a distal end of the sub photo spacer 72, which is a free end, can be prevented thereby lowering down the potential risk of generating bubble occurring at a temperature.

In summary, the present invention provides a VA liquid crystal display panel based on BM-less technology, which comprises a color mixture prevention zone formed of a stacked arrangement of red color resist and blue color resist, which can be used, in combination with a main photo spacer and a sub photo spacer that is formed of a black material as a substitute of a black matrix. Further, the color mixture prevention zone has a portion that corresponds to the main photo spacer and the sub photo spacer and comprises a recess formed therein in such a way that the main photo spacer is in engagement with a bottom of the recess to thereby increase a height difference between the main photo spacer and the sub photo spacer, expanding LC margin, and ensuring product yield rate. The present invention provides a manufacturing method of a VA liquid crystal display panel based on BM-less technology, which, through forming a color mixture prevention zone formed of a stacked arrangement of red color resist and blue color resist for use in combination with a main photo spacer and a sub photo spacer that is formed of a black material as a substitute of a black matrix, and subjecting the blue color resist or the red color resist to patterning treatment by using a the half-tone mask to form a recess in the color mixture prevention zone to increase a height difference between the main photo spacer and the sub photo spacer, helps expand LC margin and ensure product yield rate.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A vertical alignment (VA) liquid crystal display panel based on black matrix (BM)-less technology, comprising: a lower substrate, a thin-film transistor (TFT) layer formed on the lower substrate, a protective layer formed on the TFT layer, a color resist layer formed on the protective layer, a passivation layer formed on the color resist layer, a pixel electrode layer formed on the passivation layer, an upper substrate arranged opposite to the lower substrate, a common electrode layer formed on one side of the upper substrate that is adjacent to the lower substrate, a main photo spacer and a sub photo spacer formed on the common electrode layer, an enclosure sealant formed on an edge portion of the lower substrate, an edge frame formed on an edge portion of the common electrode layer and corresponding to the enclosure sealant, and a liquid crystal layer arranged between the lower substrate and the upper substrate;

the color resist layer comprising red color resist, green color resist, and blue color resist that are arranged in the form of an array, a color mixture prevention zone being arranged between every two adjacent ones of the color resists and formed of a stacked arrangement of red color resist and blue color resist;

the main photo spacer and the sub photo spacer being arranged to correspond to the color mixture prevention zone, the color mixture prevention zone having a portion that is opposite to the main photo spacer and the sub photo spacer and is provided with a recess formed therein in such a way that the main photo spacer is in engagement with a bottom of the recess;

the main photo spacer, the sub photo spacer, and the edge frame each formed of a material that comprises a black material;

wherein in the color mixture prevention zone, the blue color resist is stacked on the red color resist, the recess is formed in the blue color resist, and the red color resist has a portion that corresponds to and is located under the recess and is provided with a second recess.

2. The VA liquid crystal display panel based on BM-less technology as claimed in claim 1, wherein the TFT layer comprises: a gate electrode formed on the lower substrate, a gate insulation layer formed on the lower substrate and the gate electrode, a semiconductor layer formed on the gate insulation layer, and a source electrode and a drain electrode formed on the gate insulation layer and respectively connected to two opposite ends of the semiconductor layer;

the pixel electrode layer being connected through a via extending through the passivation layer, the color mixture prevention zone, and the protective layer to connect to the drain electrode.

3. The VA liquid crystal display panel based on BM-less technology as claimed in claim 1, wherein the color resist layer further comprises at least one of white color resist and yellow color resist.

4. A manufacturing method of a vertical alignment (VA) liquid crystal display panel based on black matrix (BM)-less technology, comprising the following steps:

(1) providing a lower substrate and forming a thin-film transistor (TFT) layer on the lower substrate;

(2) depositing a protective layer on the TFT layer and the lower substrate;

(3) forming a color resist layer on the protective layer, wherein the color resist layer comprises red color resist, green color resist, and blue color resist that are arranged in the form of an array and a color mixture prevention zone is arranged between every two adjacent ones of the color resists and is formed of a stacked arrangement of red color resist and blue color resist; the color mixture prevention zone comprises a recess formed therein;

(4) depositing and patterning a passivation layer on the color resist layer, forming a pixel electrode layer on the passivation layer, coating enclosure sealant on an edge portion of the lower substrate;

(5) providing an upper substrate and forming a common electrode layer on one side of the upper substrate that is adjacent to the lower substrate;

(6) using a black material to form a main photo spacer, a sub photo spacer, and an edge frame on the common electrode layer; and (7) laminating the lower substrate and the upper substrate to each other and filling a liquid crystal layer such that the main photo spacer and the sub photo spacer correspond to the recess with the main photo spacer in engagement with a bottom of the recess and the edge frame and the enclosure sealant engage each other;

wherein step (3) comprises:

(31) coating a red color resist film on the protective layer, patterning the red color resist film by using a half-tone mask to form red color resist and a second recess located in the red color resist;

(32) using a regular mask to form green color resist; and (33) coating and patterning blue color resist film with a regular mask to form blue color resist and a color mixture prevention zone that is located between two adjacent ones of the color resists and comprises red color resist and blue color resist stacked on the red color resist, wherein in the color mixture prevention zone, the blue color resist shows inclination of flowing on the second recess incorporated in the red color resist so as to naturally form a recess.

5. The manufacturing method of a VA liquid crystal display panel based on BM-less technology as claimed in claim 4, wherein the TFT layer comprises: a gate electrode formed on the lower substrate, a gate insulation layer formed on the lower substrate and the gate electrode, a semiconductor layer formed on the gate insulation layer, and a source electrode and a drain electrode formed on the gate insulation layer and respectively connected to two opposite ends of the semiconductor layer;

the pixel electrode layer being connected through a via extending through the passivation layer, the color mixture prevention zone, and the protective layer to connect to the drain electrode.

* * * * *